US012651451B2

(12) United States Patent
Arai et al.

(10) Patent No.: US 12,651,451 B2
(45) Date of Patent: Jun. 9, 2026

(54) SIGNAL PROCESSING APPARATUS, SIGNAL PROCESSING METHOD, AND PROGRAM USING AN OPTIMUM CONFIGURATION DETERMINED BY MACHINE LEARNING TO OUTPUT AN IMAGE IN ACCORDANCE WITH AN EXPECTATION

(71) Applicants: Sony Semiconductor Solutions Corporation, Kanagawa (JP); Sony Group Corporation, Tokyo (JP)

(72) Inventors: Hiroshi Arai, Kanagawa (JP); Yuriko Ohtsuka, Kanagawa (JP); Kenichiro Nishi, Kanagawa (JP); Takeshi Masuura, Kanagawa (JP); Norimitsu Okiyama, Kanagawa (JP); Yuji Matsui, Kanagawa (JP); Satoshi Takashima, Kanagawa (JP)

(73) Assignees: Sony Semiconductor Solutions Corporation, Kanagawa (JP); Sony Group Corporation, Tokyo (JP)

( * ) Notice: Subject to any disclaimer, the term of this patent is extended or adjusted under 35 U.S.C. 154(b) by 334 days.

(21) Appl. No.: 17/802,965

(22) PCT Filed: Feb. 10, 2021

(86) PCT No.: PCT/JP2021/005070
§ 371 (c)(1),
(2) Date: Aug. 29, 2022

(87) PCT Pub. No.: WO2021/176985
PCT Pub. Date: Sep. 10, 2021

(65) Prior Publication Data
US 2023/0108850 A1     Apr. 6, 2023

(30) Foreign Application Priority Data
Mar. 5, 2020     (JP) ................................. 2020-037686

(51) Int. Cl.
| | | |
|---|---|---|
| G06V 10/84 | (2022.01) | |
| G06T 7/60 | (2017.01) | |
| G06T 9/00 | (2006.01) | |

(52) U.S. Cl.
CPC ................ G06V 10/84 (2022.01); G06T 7/60 (2013.01); G06T 9/00 (2013.01)

(58) Field of Classification Search
None
See application file for complete search history.

(56) References Cited

U.S. PATENT DOCUMENTS

| | | | | | |
|---|---|---|---|---|---|
| 11,153,566 B1 * | 10/2021 | Tao | ...................... | H04N 19/124 |
| 11,521,716 B2 * | 12/2022 | Vianu | ................... | G16H 15/00 |

(Continued)

FOREIGN PATENT DOCUMENTS

JP     6638852 B1     1/2020

OTHER PUBLICATIONS

International Search Report and Written Opinion mailed on Apr. 6, 2021, received for PCT Application PCT/JP2021/005070, filed on Feb. 10, 2021, 11 pages including English Translation.

(Continued)

*Primary Examiner* — Tahmina N Ansari
(74) *Attorney, Agent, or Firm* — XSENSUS LLP

(57) ABSTRACT

A signal processing apparatus includes: a data input unit to which image data is input; an output unit configured to output an output value based on the data input to the data input unit; an expectation feedback calculator configured to calculate a difference between an expectation based on the input data and the output value; and a Bayesian estimator to which information on the difference and information based on the image data are input and which is configured to perform machine learning in order to approximate the output (Continued)

value to the expectation based on the input information and
to search for an optimum configuration.

20 Claims, 10 Drawing Sheets

(56)                    References Cited

U.S. PATENT DOCUMENTS

| | | | |
|---|---|---|---|
| 11,709,273 B2 * | 7/2023 | Kocer | G01S 1/24 |
| | | | 342/357.29 |
| 2011/0282181 A1 * | 11/2011 | Wang | A61B 5/0095 |
| | | | 600/407 |
| 2019/0317220 A1 * | 10/2019 | Kocer | G01S 19/46 |
| 2021/0064925 A1 * | 3/2021 | Shih | G06N 3/084 |
| 2023/0108850 A1 * | 4/2023 | Arai | G06V 10/446 |
| | | | 382/155 |
| 2024/0305886 A1 * | 9/2024 | Tayanaka | H04N 23/687 |

OTHER PUBLICATIONS

Chollet et al., "Deep Learning with Python", Mynavi Publishing
Corporation, May 23, 2018, 19 pages.
Nakada, "A style transfer method using variational autoencoder",
IEICE Technical Report, vol. 117, No. 514, pp. 121-126 (11 pages
including English Abstract).

* cited by examiner

1

SIGNAL PROCESSING APPARATUS, SIGNAL PROCESSING METHOD, AND PROGRAM USING AN OPTIMUM CONFIGURATION DETERMINED BY MACHINE LEARNING TO OUTPUT AN IMAGE IN ACCORDANCE WITH AN EXPECTATION

CROSS-REFERENCE TO RELATED APPLICATIONS

The present application is based on PCT filing PCT/JP2021/005070, filed Feb. 10, 2021, which claims priority to Japanese Patent Application No. 2020-037686, filed Mar. 5, 2020, the entire contents of each are incorporated herein by reference.

TECHNICAL FIELD

The present technique relates to a signal processing apparatus, a signal processing method, and a program, and more particularly to a technique using machine learning.

BACKGROUND ART

With developments in the field of machine learning, machine learning is being used to obtain an optimum solution for various problems.

For example, PTL 1 discloses a technique in which a recognition processing unit is provided as a machine learning unit configured to perform recognition processing using a DNN (Deep Neural Network).

CITATION LIST

Patent Literature

JP 6638852 B

SUMMARY

Technical Problem

An object of the present technique is to obtain an optimum solution with respect to various problems, particularly problems regarding images, by performing machine learning using a Bayesian estimation method.

Solution to Problem

A signal processing apparatus according to the present technique includes: a data input unit to which image data is input; an output unit configured to output an output value based on the data input to the data input unit; an expectation feedback calculator configured to calculate a difference between an expectation based on the input data and the output value; and a Bayesian estimator to which information on the difference and information based on the image data are input and which is configured to perform machine learning in order to approximate the output value to the expectation based on the input information and to search for an optimum configuration.

Accordingly, a configuration in order to approximate an output value to an expectation can be searched.

In the signal processing apparatus described above, the expectation may vary depending on performance of a stabilization function to be applied to image data. Accordingly, the Bayesian estimator performs machine learning for the purpose of improving performance of the stabilization function.

In the signal processing apparatus described above, output data from an inertial measurement unit may be input together with the image data to the data input unit, and the signal processing apparatus may include a sensor fusion unit configured to perform sensor fusion processing for obtaining geometric and physical consistencies between input data from the inertial measurement unit and the image data.

Accordingly, processing for ensuring consistency between pieces of input data of different domains is executed in the data input unit.

The Bayesian estimator in the signal processing apparatus described above may be configured to search for an additional physical sensor for improving the stabilization function in the search for an optimum configuration.

Accordingly, a search for a sensor condition for improving performance of the stabilization function is performed in the Bayesian estimator.

The Bayesian estimator in the signal processing apparatus described above may be configured to search for an algorithm to perform image recognition processing for improving the stabilization function in the search for an optimum configuration.

Accordingly, a search for an image recognition processing block (an AI (Artificial Intelligence) block) for improving performance of the stabilization function is performed in the Bayesian estimator.

The Bayesian estimator in the signal processing apparatus described above may be configured to function as a calculator that shares responsibility of the stabilization function after the machine learning.

Accordingly, a Bayesian estimation algorithm acquired by machine learning of expectation search, image recognition, and image analysis is effectively utilized and performance of the stabilization function is improved.

In the signal processing apparatus described above, the expectation may vary depending on performance of image compression and image restoration with respect to image data.

Accordingly, the Bayesian estimator performs machine learning for improving compression performance and expansion performance of image data.

The signal processing apparatus described above may include an image compression unit configured to perform the image compression and an image expansion unit configured to perform the image restoration.

Accordingly, machine learning for improving compression performance and expansion performance of image data can be efficiently performed.

The Bayesian estimator in the signal processing apparatus described above may be configured to search for a blend ratio of a decoded image obtained by the image expansion unit during the machine learning and information based on the difference in order to improve performance of the image restoration when searching for the optimum configuration.

Accordingly, in order to improve image restoration performance, for example, a blend ratio of high-frequency information for obtaining a super-resolution effect is calculated.

The Bayesian estimator in the signal processing apparatus described above is configured to function as a calculator that shares responsibility of the function of the image expansion unit after the machine learning.

Accordingly, an algorithm for image compression and image expansion acquired by machine learning is effectively utilized and compression/expansion performance is improved.

In the signal processing apparatus described above, a control line for changing a degree of deterioration may be input to the image compression unit.

Accordingly, machine learning is performed for each tendency of deterioration of an image.

A signal processing method according to the present technique is a signal processing method in which a signal processing apparatus executes processing of; accepting input of image data; outputting an output value based on the input image data; calculating a difference between an expectation based on the input image data and the output value; and performing machine learning in order to approximate the output value to the expectation based on information on the difference and information based on the image data and searching for an optimum configuration.

A program according to the present technique is a program causing a signal processing apparatus to execute processing of; accepting input of image data; outputting an output value based on the input image data; calculating a difference between an expectation based on the input image data and the output value; and performing machine learning in order to approximate the output value to the expectation based on information on the difference and information based on the image data and searching for an optimum configuration.

Accordingly, a configuration in order to approximate an output value to an expectation is searched.

DESCRIPTION OF EMBODIMENTS

Hereinafter, embodiments will be described in the following order.

<1. First embodiment>
<1-1. System configuration during machine learning>
<1-2. System configuration during operation>
<1-3. Processing example>
<2. Second embodiment>
<2-1. System configuration during machine learning>
<2-2. System configuration after machine learning>
<2-3. Processing example>
<3. Summary>
<4. Present technique>

1. First Embodiment

A signal processing apparatus 1 according to a first embodiment is an apparatus for performing signal processing in order to realize a stabilization function in an imaging apparatus. First, by being incorporated into a configuration for performing machine learning, the signal processing apparatus 1 is used for a search for an optimum sensor input condition for satisfying a desired stabilization performance. After searching for an optimum sensor input condition by machine learning, the signal processing apparatus 1 exhibits the desired stabilization performance by being incorporated into an imaging apparatus equipped with an optimum sensor configuration.

<1-1. System Configuration During Machine Learning>

Figure 1:
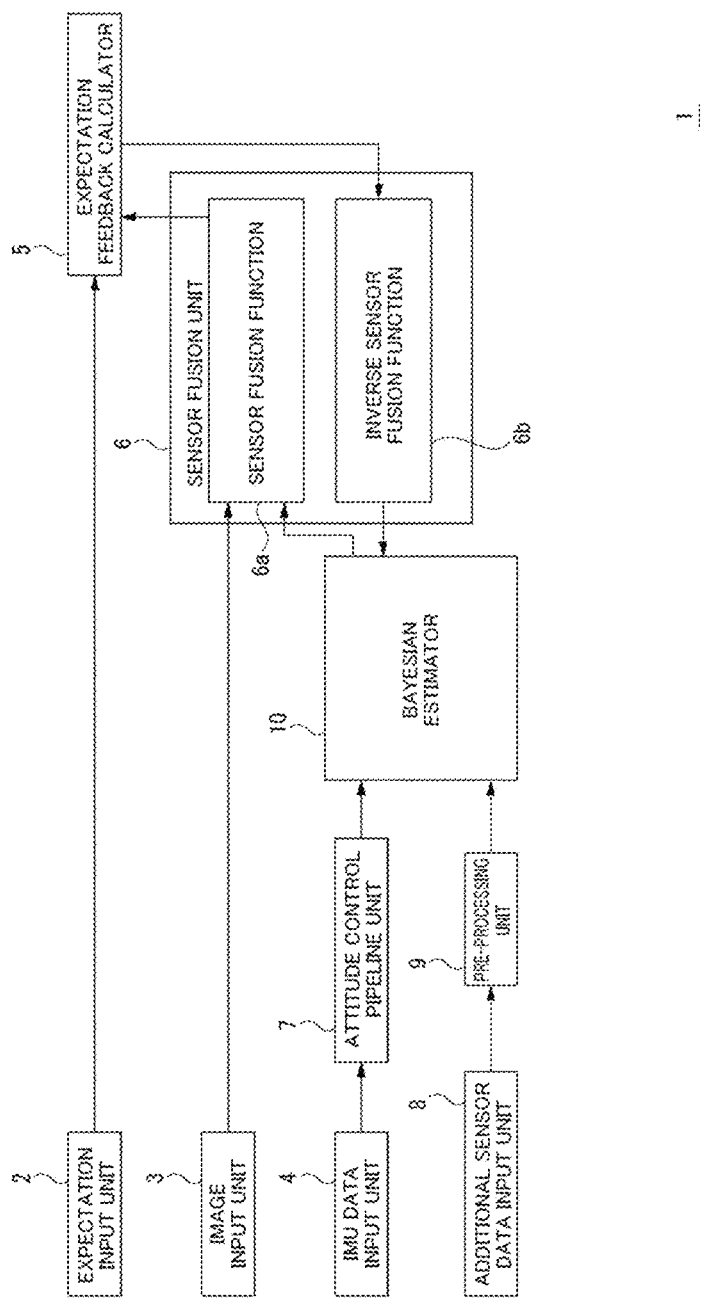
FIG. 1 is a block diagram illustrating a configuration example of a signal processing apparatus during machine learning according to a first embodiment.

First, a configuration of the signal processing apparatus 1 having been incorporated into a machine learning system for performing a search for an optimum sensor input condition will be described with reference to FIG. 1.

The signal processing apparatus 1 includes an expectation input unit 2, an image input unit 3, an IMU (Inertial Measurement Unit) data input unit 4, an expectation feedback calculator 5, a sensor fusion unit 6, an attitude control pipeline unit 7, an additional sensor data input unit 8, a pre-processing unit 9, and a Bayesian estimator 10.

A target expectation in a state where a desired stabilization function has been applied is input to the expectation input unit 2. Realizing the stabilization function requires associating, for each pixel of an output image, whichever coordinates of an input image at which data is to be used in order to absorb shake created by an attitude change or the like of the imaging apparatus. In other words, a corresponding point in an input image with respect to a pixel in an output image is calculated. A divergence between a pixel of an output image and a pixel in an input image which correspond to each other is considered, for example, a movement amount of an image.

Captured image data is input to the image input unit 3. Image data is captured by an imaging unit or an optical system provided outside of the signal processing apparatus 1. The signal processing apparatus 1, the imaging unit, and the optical system may be integrally formed as an imaging apparatus or the signal processing apparatus 1 and the imaging apparatus may be formed separately.

Data output from an IMU is input to the IMU data input unit 4. The IMU is, for example, an apparatus which outputs rotational angular velocity data, acceleration data, and temperature data in three axial directions as IMU data and which is used for attitude detection of an imaging apparatus or the like. IMU data is output at predetermined periods. Specifically, a plurality of pieces of IMU data are output while one frame's worth of images are being captured. IMU data is configured so that a timing of acquisition of the IMU data while images are being captured can be known. For example, IMU data output at an exposure timing of a certain line in one frame's worth of images is associated with a line number. Accordingly, the IMU data and the line in a captured image are synchronized.

IMU data input to the IMU data input unit 4 is output to the attitude control pipeline unit 7.

The expectation feedback calculator 5 receives an expectation (a rotation amount) from the expectation input unit 2. In addition, an output value of a sensor fusion function 6a of the sensor fusion unit 6 (to be described later) is input to the expectation feedback calculator 5. The expectation feedback calculator 5 calculates a performance of the stabilization function with respect to an input value from the sensor fusion unit 6 and obtains a residual error from the expectation.

The residual error from the expectation can also be considered a movement amount of an image. The calculated residual error is input to the sensor fusion unit 6 (an inverse sensor fusion function 6b).

The sensor fusion unit 6 includes the sensor fusion function 6a which performs sensor fusion processing and the inverse sensor fusion function 6b which performs inverse sensor fusion processing.

Sensor fusion processing is processing for ensuring geometric and physical consistencies between image data and a rotation amount calculated from IMU data. In other words, sensor fusion processing refers to processing for ensuring consistency among pieces of data output from sensors of different types (for example, a CMOS (Complementary Metal Oxide Semiconductor) sensor and a motion sensor).

Inverse sensor fusion processing is, for example, processing for calculating an intrinsic and ideal rotation amount value by performing a geometric calculation using a residual error from the expectation (a movement amount of an image). The ideal rotation amount value is output to the Bayesian estimator 10.

Sensor fusion processing and inverse sensor fusion processing can be described as being in a relationship of, as it were, a function $y=f(x)$ and its inverse function $x=f^{-1}(y)$. However, in the inverse sensor fusion processing, for example, using a technique such as self-position estimation (SLAM: Simultaneous Localization and Mapping) or the like from an image being an approach that differs from self-position estimation from the IMU, a local motion of a subject and a global motion of a camera are separated and a residual error from the expectation is calculated as a three-dimensional differential rotation amount from the global motion being a camera movement amount.

For example, a feature point is extracted using a self-position estimation technique and a rotation amount and a translation amount are calculated three-dimensionally.

A differential rotation amount obtained in this manner is fed back to the Bayesian estimator 10.

The attitude control pipeline unit 7 associates attitude information with each pixel of an output image. Attitude information refers to a representation of an attitude of an imaging unit or an optical system (or an imaging apparatus) having captured an output image in terms of quaternions or rotation vectors. In addition, the attitude control pipeline unit 7 calculates a pixel position on an input image corresponding to each pixel of an output image using attitude information associated with each pixel of the output image.

Furthermore, the attitude control pipeline unit 7 performs correction processing corresponding to lens distortion correction with respect to the pixel on the input image corresponding to each pixel of the output image. In this manner, the attitude control pipeline unit 7 calculates a pixel in the input image corresponding to each pixel in the output image.

Information calculated by the attitude control pipeline unit 7 is input to the Bayesian estimator 10.

Since the additional sensor data input unit 8 cannot be prepared as a sensor with reality at this stage, the additional sensor data input unit 8 alternatively operates as a physical simulator or a machine learning simulator. Specifically, the additional sensor data input unit 8 simulates a device simulator (CAD: Computer-Aided Design), a general-purpose device such as a GPS (Global Positioning System), an SLAM that obtains a rotation amount from an image, or external meta-information calculated by an AI. Output of the additional sensor data input unit 8 as a physical simulator or an AI simulator is output to the pre-processing unit 9.

The pre-processing unit 9 executes calibration processing such as bias correction and temperature characteristic correction with respect to data of a simulation sensor having been input from the additional sensor data input unit 8. The data input to the pre-processing unit 9 is input to the Bayesian estimator 10 after being subjected to the calibration processing.

The Bayesian estimator 10 receives input of a difference from an ideal rotation amount value (expectation) as calculated in the inverse sensor fusion processing in the sensor fusion unit 6 (in other words, the differential rotation amount described earlier), calculated data of the attitude control pipeline unit 7, and data after calibration by the pre-processing unit 9.

The Bayesian estimator 10 performs machine learning using Bayesian estimation based on the three pieces of input data and determines a configuration of an optimum simulation sensor for outputting the ideal rotation amount value. In other words, due to machine learning of the Bayesian estimator 10, trial and error according to machine learning enables an automatic search to be performed with respect to what kind of characteristics a sensor must have or what kind of physical sensor or image recognition AI sensing with a high calculation cost must be added in order to realize a desired stabilization function.

This will be described with reference to a specific example.

Figure 2:
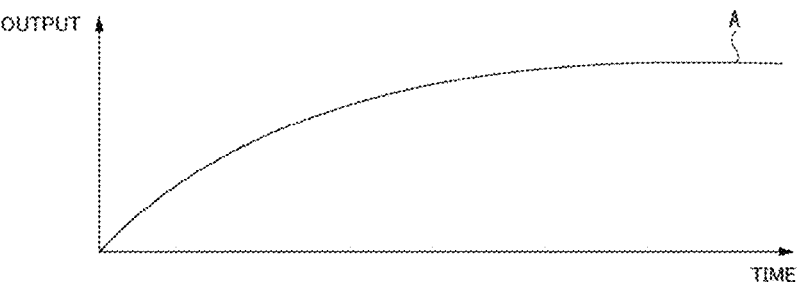
FIG. 2 is an explanatory diagram illustrating a divergence between an expectation and a control value according to the first embodiment.
Figure 2:
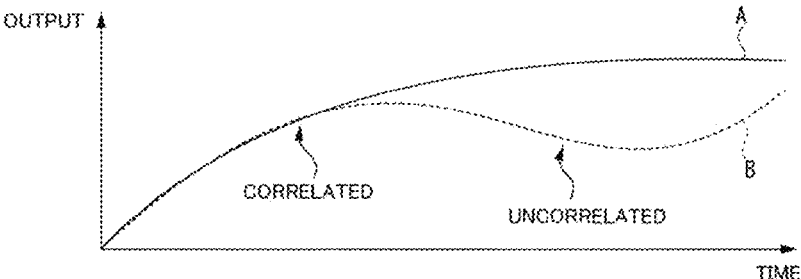
Figure 2:
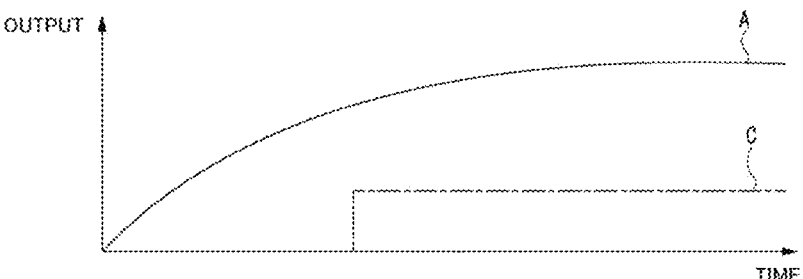

FIG. 2 illustrates three graphs. A top graph is a graph A (solid line) representing expectation. In addition, a second from top graph is a graph B (dashed line) representing a sensor input value that is input to the IMU data input unit 4. In other words, graph B (dashed line) represents an output value from the IMU mounted to the signal processing apparatus 1 at present.

Even if control is performed using an output value of the IMU mounted to the signal processing apparatus 1 at present, it is conceivable that a control value in accordance with the expectation cannot be output. There is no guarantee that an output value of the IMU includes necessary and sufficient information under normal control.

In such a case, a simulation sensor (or image recognition AI sensing with a high calculation cost) which outputs an output value such as that represented by a bottom graph C (dashed-dotted line) in FIG. 2 is estimated by the Bayesian estimator 10.

Using the estimated simulation sensor or the like or, in other words, performing control using graph B and graph C enables a control value that more closely resembles graph A being the expectation to be output.

More specifically, for example, an acceleration sensor or a gyroscope sensor mounted to the signal processing apparatus 1 is incapable of sufficiently discriminating, with a single-IMU configuration, between gravity of the earth and a centrifugal force created with motion. When the signal processing apparatus 1 moves violently or the like, there is a risk that an actual attitude of the signal processing apparatus 1 and an attitude of the signal processing apparatus 1 estimated from IMU data may differ from each other.

In such a case, a search can be performed using the Bayesian estimator 10 as to what kind of image processing may be performed by an AI so that the estimated attitude matches the actual attitude.

In the process of determining a configuration of an optimum simulation sensor for realizing a desired stabilization function, the Bayesian estimator 10 acquires a function as a calculator constituting a signal processing algorithm for realizing the desired stabilization function using the searched optimum simulation sensor.

Specifically, in order to realize the stabilization function, signal processing must be performed using both data output from the optimum simulation sensor (or an actual additional sensor replacing the simulation sensor) and IMU data input to the IMU data input unit 4 and a rotation amount value must be calculated. The closer the rotation amount value is to an ideal rotation amount value, the more the desired stabilization function can be obtained.

In the process of machine learning, the Bayesian estimator 10 acquires a function as a calculator in signal processing using data output from the simulation sensor and IMU data input to the IMU data input unit 4.

<1-2. System Configuration During Operation>

Once machine learning using Bayesian estimation is completed and a configuration of an optimum simulation sensor is determined, the optimum simulation sensor is replaced with an actual sensor. Accordingly, instead of operating as a physical simulator, the additional sensor data input unit 8 functions as an input unit to which actual sensor data is to be input.

Figure 3:
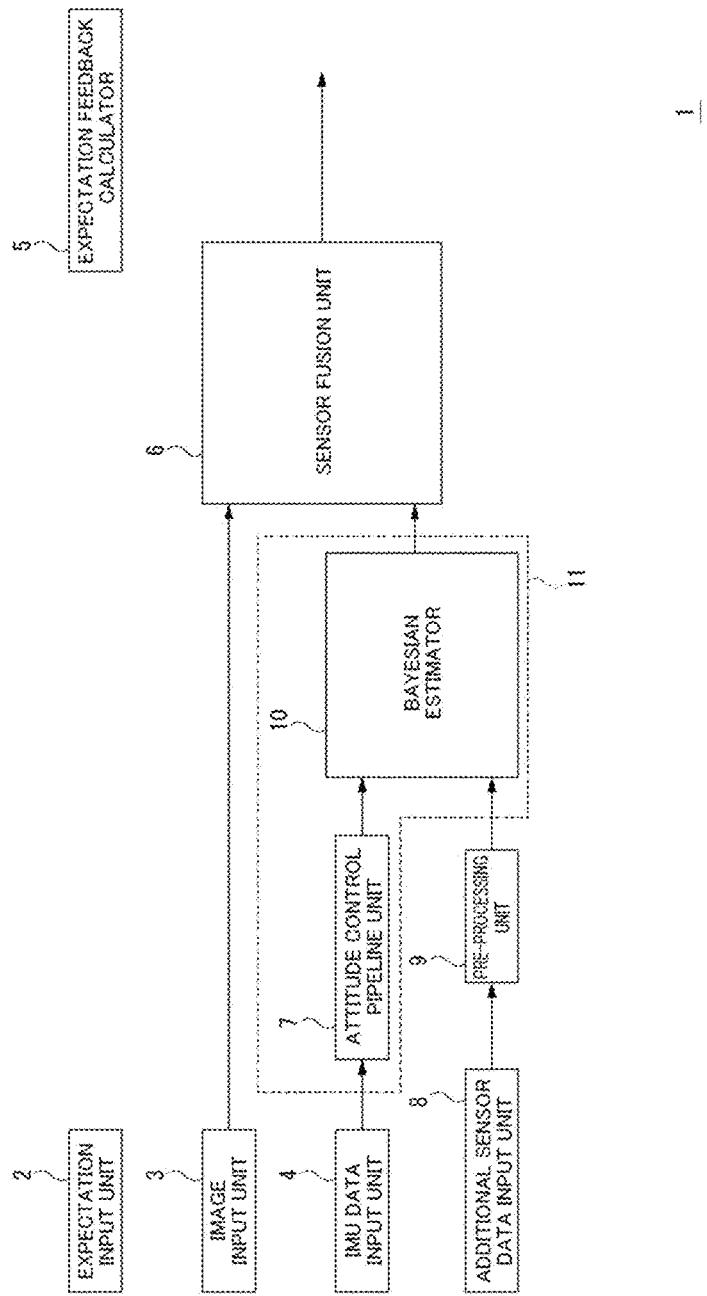
FIG. 3 is a block diagram illustrating a configuration example of the signal processing apparatus during operation according to the first embodiment.

Operations of each unit will now be specifically described with reference to FIG. 3. Captured image data is input to the image input unit 3 in a similar manner to during learning. The input image data is output to the sensor fusion unit 6.

Data output from the IMU is input to the IMU data input unit 4 in a similar manner to during learning. The input IMU data is output to the attitude control pipeline unit 7.

Sensor data from the actual sensor having replaced the optimum simulation sensor estimated by the Bayesian estimator 10 is input to the additional sensor data input unit 8. The input sensor data is output to the pre-processing unit 9.

The pre-processing unit 9 executes calibration processing such as bias correction and temperature characteristic correction with respect to the input sensor data. Data after the calibration processing is output to the Bayesian estimator 10.

The attitude control pipeline unit 7 and the Bayesian estimator 10 respectively function as a calculator of improved stabilization processing when the optimum simulation sensor estimated by machine learning is actually incorporated. Here, the attitude control pipeline unit 7 and the Bayesian estimator 10 will be collectively described as an improved calculating unit 11.

The improved calculating unit 11 receives IMU data and sensor data of the added sensor, calculates a rotation amount value, and outputs the rotation amount value to the sensor fusion unit 6. An algorithm of signal processing executed by the improved calculating unit 11 is acquired during the process of machine learning. In other words, the algorithm of signal processing is to be completed at the conclusion of machine learning.

The sensor fusion unit 6 receives image data from the image input unit 3 and receives the rotation amount value from the improved calculating unit 11, and performs processing for ensuring geometric and physical consistencies between the image data and the rotation amount value.

By performing the processing, the sensor fusion unit 6 is able to output image data having been subjected to stabilization processing for realizing a desired stabilization function.

<1-3. Processing Example>

An example of respective processing steps executed by the signal processing apparatus 1 will be described with reference to FIG. 4.

In step S101, first, the signal processing apparatus 1 defines an expectation with respect to an application. For example, in the example described above, as an expectation of an application for performing stabilization processing, a level of a target stabilization function is determined and an expectation thereof is defined.

Next, in step S102, the signal processing apparatus 1 performs stabilization processing with respect to input image data. In addition, the signal processing apparatus 1 measures performance of the executed stabilization processing.

In step S103, the signal processing apparatus 1 calculates how much the executed stabilization processing diverges away from the expectation defined in step S101. This processing is processing of calculating a movement amount of an image as a residual error from the expectation in the example described above.

In step S104, the signal processing apparatus 1 calculates a rotation expectation from the residual error from the expectation.

In step 105, the signal processing apparatus 1 performs a search for an additional configuration due to Bayesian estimation. The additional configuration is the additional physical sensor or the image recognition AI sensing described earlier.

In step S106, the signal processing apparatus 1 determines whether or not the performance of the stabilization processing has improved. When the performance of the stabilization processing has not improved, the signal processing apparatus 1 returns to step S105 and searches for an additional configuration once again.

On the other hand, when the performance of the stabilization processing has improved, the signal processing apparatus 1 advances to step S107 and updates configuration.

Figure 4:
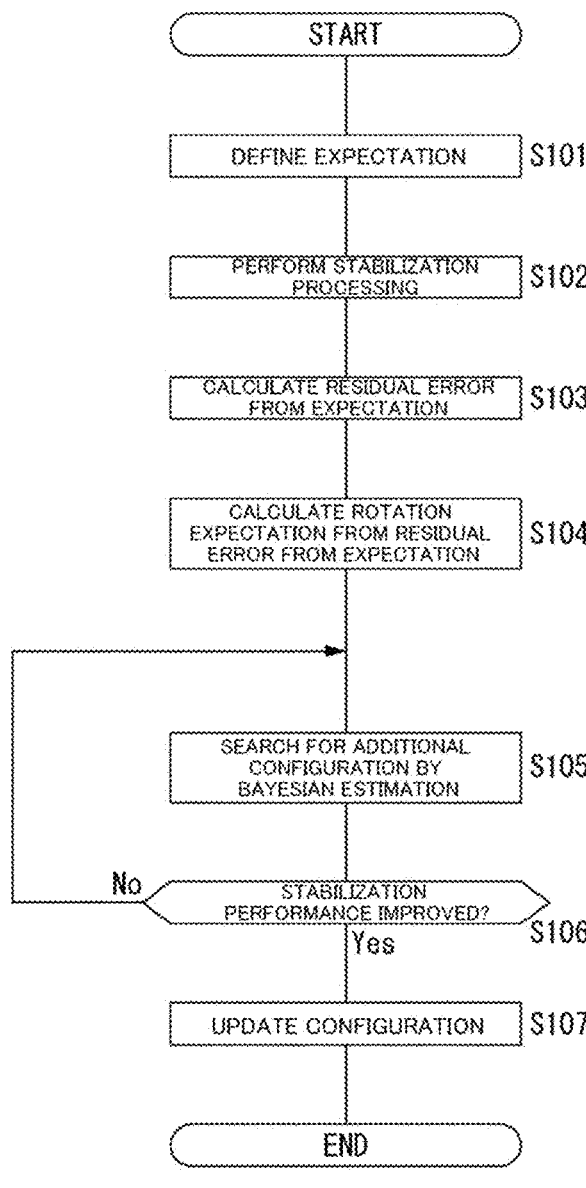
FIG. 4 is an example of a flow chart of respective processing steps according to the first embodiment.

Note that the series of processing steps shown in FIG. 4 may be repetitively executed until the performance of the stabilization processing reaches a target.

2. Second Embodiment

In the first embodiment, an optimum configuration search of an additional sensor which receives image data and IMU data as input and which obtains preferable stabilization performance from the image data and the IMU data has been described. In a next second embodiment, an AI optimum solution search which uses image data as input to obtain preferable image compression performance from the image data will be described.

<2-1. System Configuration During Machine Learning>

A signal processing apparatus 1A according to the second embodiment uses Bayesian estimation in order to output an output image with, as much as possible, a resolution of a same image quality as the input image.

Figure 5:
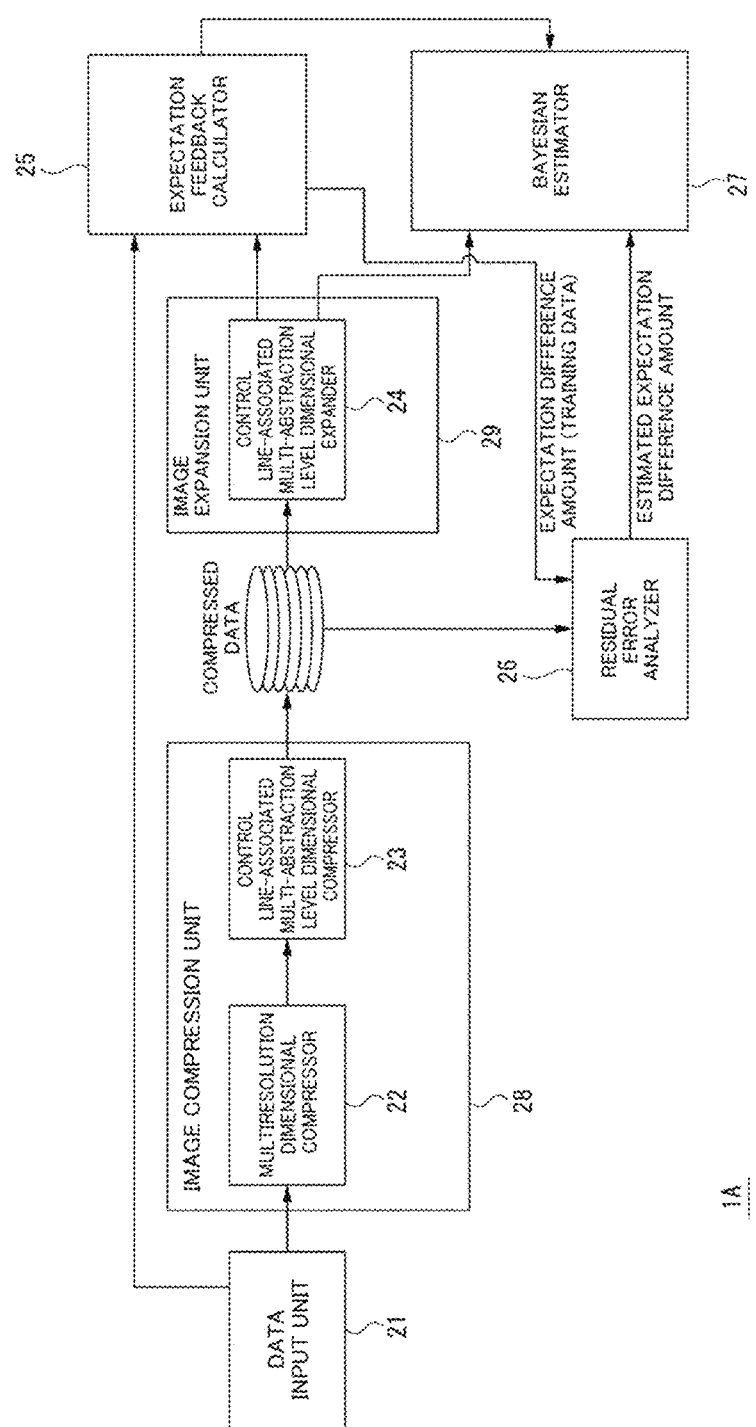
FIG. 5 is a schematic explanatory diagram illustrating a configuration example of a signal processing apparatus during machine learning according to a second embodiment.

To this end, the signal processing apparatus 1A includes a data input unit 21, a multiresolution dimensional compressor 22, a multi-abstraction level dimensional compressor 23 which performs machine learning in association with a control line, a multi-abstraction level dimensional expander 24 which performs machine learning in association with a control line, an expectation feedback calculator 25, a residual error analyzer 26, and a Bayesian estimator 27 (refer to FIG. 5).

Note that the configuration illustrated in FIG. 5 is a configuration of the signal processing apparatus 1A during machine learning.

Image data is input to the data input unit 21.

The multiresolution dimensional compressor 22 and the multi-abstraction level dimensional compressor 23 function as an image compression unit 28 responsible for a phase of image compression. However, since the multiresolution dimensional compressor 22 is a portion corresponding to pre-training for increasing accuracy of compression in the multi-abstraction level dimensional compressor 23 of a subsequent stage, the multiresolution dimensional compressor 22 may perform non-compression (or approximately reversible transform compression) which is not always accompanied by image compression.

The multi-abstraction level dimensional expander 24 associated with a control line functions as an image expansion unit 29 responsible for a phase of expansion (restoration) of compressed data.

The expectation feedback calculator 25, the residual error analyzer 26, and the Bayesian estimator 27 are provided for increasing accuracy of expansion of compressed data.

For example, the multiresolution dimensional compressor 22 uses, as training data, a degraded image to which frequency component degradation is imparted using a so-called Haar wavelet transform and which is made up of eight pixels in each of longitudinal and lateral directions. As a generation procedure of an 8-by-8 pixel degraded image as training data, first, 8-by-8 pixels are subjected to a wavelet transform, a high-frequency component is removed therefrom, and an inverse wavelet transform is performed to generate 8-by-8 pixels.

Figure 6:
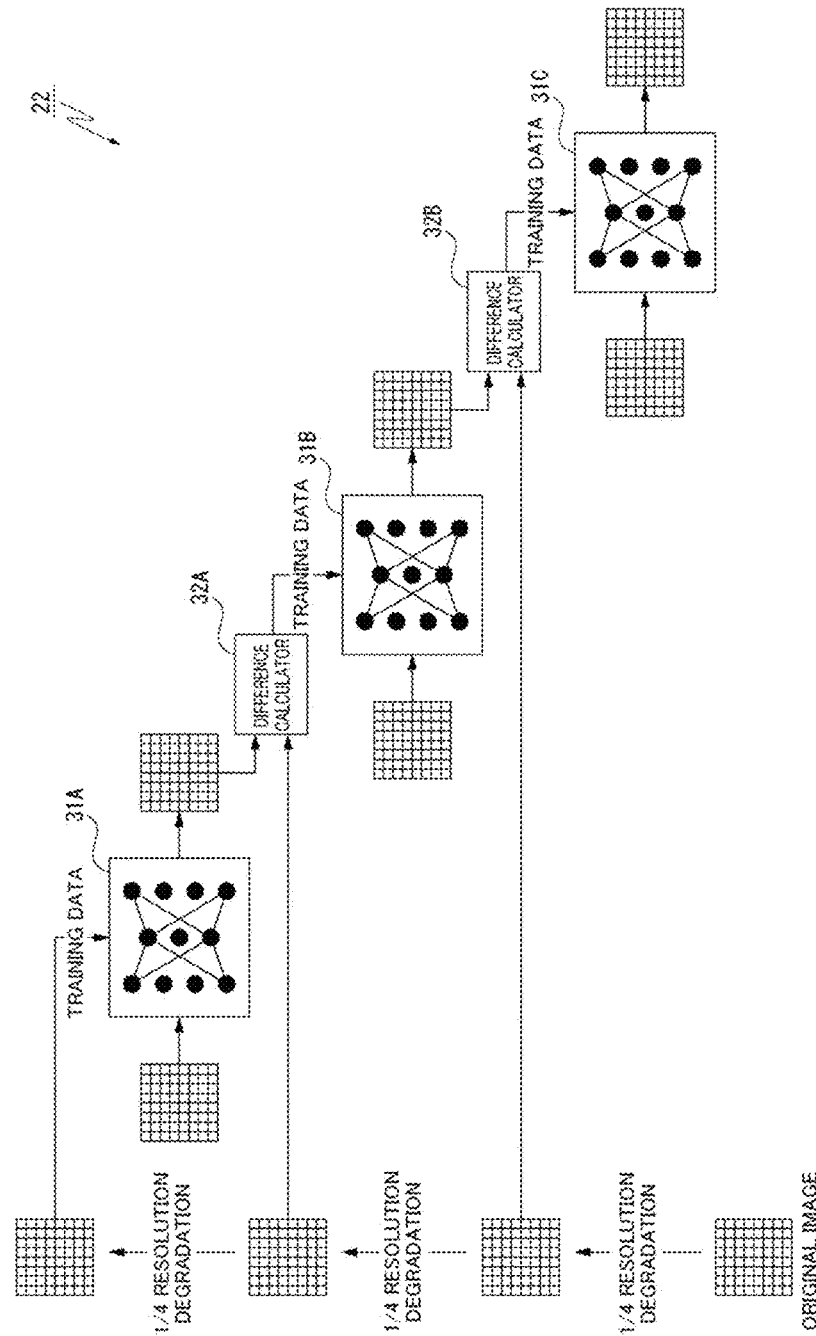
FIG. 6 represents a configuration example of a multiresolution dimensional compressor according to the second embodiment.

This will be specifically described with reference to FIG. 6.

The multiresolution dimensional compressor 22 adopts a multilayer structure made up of, for example, three layers.

On one layer, for example, an image made up of eight pixels in each of longitudinal and lateral directions for a total of 64 pixels is input. The input 64-pixel image is subjected to dimensional compression by an autoencoder 31 to extract DNN (Deep Neural Network) feature amount compressed data. In other words, in the case of a three-layer structure, DNN feature amount compressed data is extracted from each of the frequency components of the three layers. In the autoencoder 31, for example, an intermediate layer has eight neurons and, therefore, $\frac{8}{64}$ compressed data is to be obtained in a frequency band of the layer.

The image to be input is an original image, and the training data given to the autoencoder 31 is a degraded image or a difference between an output of the autoencoder 31 in a previous stage and the degraded image.

Each layer will be specifically described. In a first layer (a top layer), an original image and a $\frac{1}{64}$ resolution degraded image as training data are input to an autoencoder 31A. The $\frac{1}{64}$ resolution degraded image is an image obtained through the procedures of wavelet transform, high-frequency component removal, and inverse wavelet transform described earlier.

In the autoencoder 31A, by performing restoration by a decoder after performing dimensional compression by an encoder, image data is output and, at the same time, DNN feature amount compressed data as an artifact is output in a present block.

An output image from the autoencoder 31A is input to a difference calculator 32A. In addition, a $\frac{1}{16}$ resolution degraded image is input to the difference calculator 32A.

The difference calculator 32A calculates a difference between the output image from the autoencoder 31A and the $\frac{1}{16}$ resolution degraded image and outputs the difference as training data to an autoencoder 31B.

The original image is further input to the autoencoder 31B.

In other words, the autoencoder 31B of a second layer (an intermediate layer) is provided with the original image as an input and a difference output of the difference calculator 32A is provided as training data.

By performing restoration by a decoder after performing dimensional compression by an encoder in a similar manner to the autoencoder 31A, the autoencoder 31B outputs image data and, at the same time, outputs DNN feature amount compressed data.

An output image from the autoencoder 31B is input to a difference calculator 32B. In addition, a $\frac{1}{4}$ resolution degraded image is input to the difference calculator 32B.

The difference calculator 32B calculates a difference between the output image from the autoencoder 31B and the $\frac{1}{4}$ resolution degraded image and outputs the difference as training data to an autoencoder 31C.

The original image is further input to the autoencoder 31C.

In other words, the original image and a difference output of the difference calculator 32B as training data are input to the autoencoder 31C of a third layer (a bottom layer).

By performing restoration by a decoder after performing dimensional compression by an encoder in a similar manner to the autoencoders 31A and 31B, the autoencoder 31C outputs image data and, at the same time, outputs DNN feature amount compressed data as an artifact.

In other words, DNN feature amount compressed data is output from each of the autoencoders 31A, 31B, and 31C. The pieces of DNN feature amount compressed data are pieces of Haar feature amount data and are input to the multi-abstraction level dimensional compressor 23 in the subsequent stage.

Note that the multiresolution dimensional compressor 22 may perform learning aimed at accuracy of approximately reversible transform of which a compression ratio is non-compression. In this case, substantial compression processing is to be performed by the multi-abstraction level dimensional compressor 23 in the subsequent stage.

For example, the multi-abstraction level dimensional compressor 23 has a multilayer structure which is made up of three layers and which combines a multi-abstraction level analysis processing unit 41, a max pooling processing unit, a control line input unit 43, and a switch 44.

In each layer, convolution processing is performed and, when necessary, max pooling processing is performed.

Figure 7:
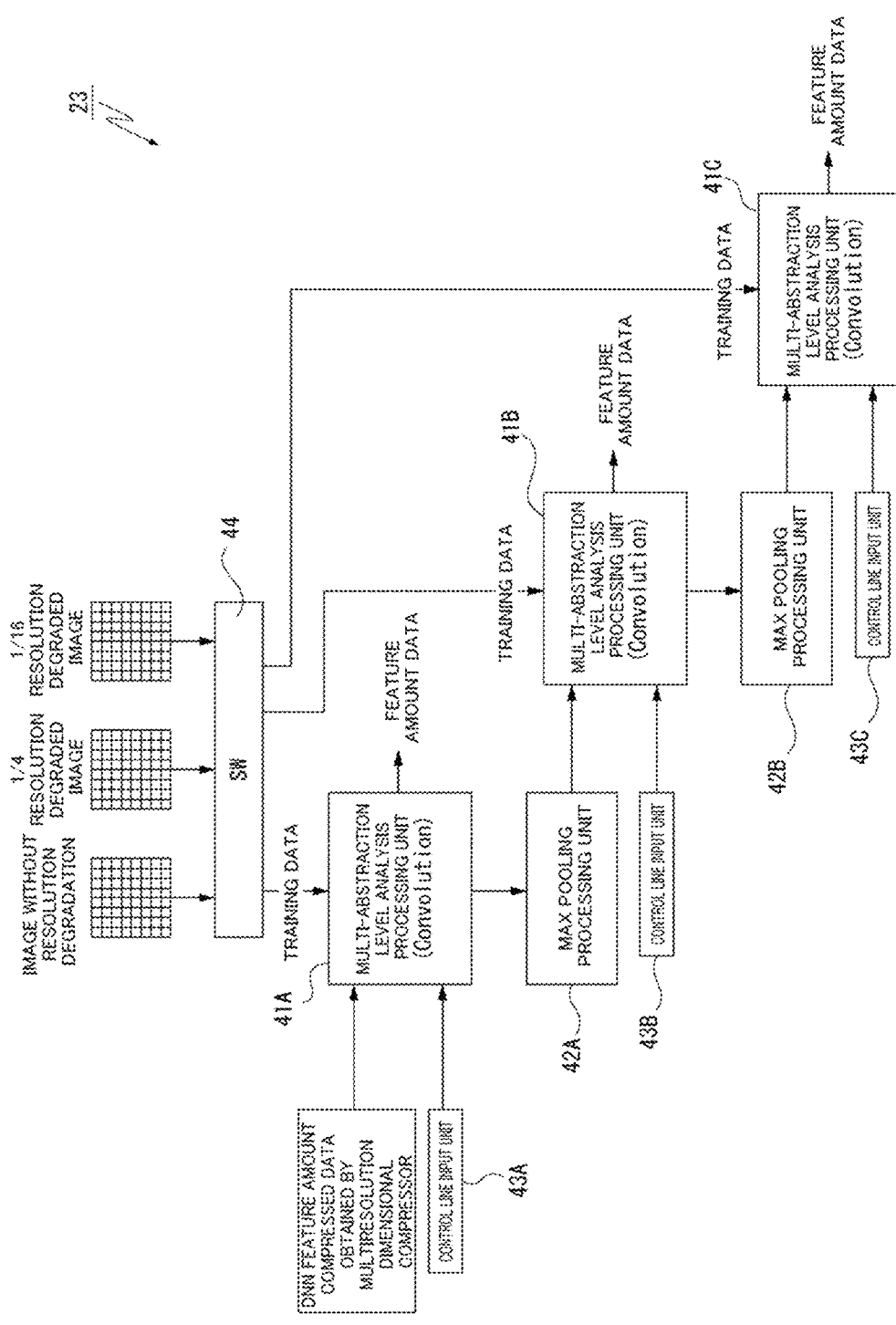
FIG. 7 represents a configuration example of a multi-abstraction level dimensional compressor according to the second embodiment.

This will be specifically described with reference to FIG. 7.

A first layer (top layer) includes a multi-abstraction level analysis processing unit 41A which performs convolution processing with respect to Haar feature amount data obtained by the multiresolution dimensional compressor 22.

In addition, a resolution degraded image is input as training data to the multi-abstraction level analysis processing unit 41A. The resolution degraded image that is input as training data is, for example, an image degraded by a Daubechies wavelet transform.

The multi-abstraction level analysis processing unit 41A performs convolution processing based on the resolution degraded image as training data with respect to the Haar feature amount data.

There are a plurality of pieces of training data which may be input to the multi-abstraction level analysis processing unit 41A, and the piece of training data to be input is determined by control data that is input to a control line input unit 43A. In other words, by changing control data to be input to the control line input unit 43A, switching among pieces of training data can be performed.

To this end, the multi-abstraction level dimensional compressor 23 includes the switch 44.

For example, when the control data input to the control line input unit 43A is "0.0", an image without resolution degradation is selected by the switch 44 and input to the multi-abstraction level analysis processing unit 41A as training data. In addition, when the control data input to the control line input unit 43A is "0.5", a ¼ resolution degraded image is selected by the switch 44 and input to the multi-abstraction level analysis processing unit 41A as training data. Furthermore, when the control data input to the control line input unit 43A is "1.0", a 1/16 resolution degraded image is selected by the switch 44 and input to the multi-abstraction level analysis processing unit 41A as training data.

DNN feature amount compressed data is generated from the multi-abstraction level analysis processing unit 41A. The DNN feature amount compressed data is Daubechies feature amount data.

In the multi-abstraction level analysis processing unit 41A, a different algorithm can be acquired by a dimension of the intermediate layer.

For example, when an input layer to which an input image of 64 pixels is input has 64 dimensions and an intermediate layer has 32 dimensions, a 50% (32/64) fixed length coding compression algorithm can be acquired. In addition, the acquired algorithm is an algorithm that enables resolution to be finely adjusted in accordance with control data input to the control line input unit 43A.

The output data from the multi-abstraction level analysis processing unit 41A is input to a max pooling processing unit 42A. The max pooling processing unit 42A performs max pooling processing when necessary. A description regarding in what kind of cases max pooling processing is to be performed will be provided later.

An output of the max pooling processing unit 42A is input to the multi-abstraction level analysis processing unit 41B. In addition, control data is input to the multi-abstraction level analysis processing unit 41B from a control line input unit 43B.

Training data selected by the switch 44 based on the control data is input to the multi-abstraction level analysis processing unit 41B.

DNN feature amount compressed data (compressed data in diagram) that is Daubechies feature amount data is output from the multi-abstraction level analysis processing unit 41B.

Output data of the multi-abstraction level analysis processing unit 41B is input to a max pooling processing unit 42B. The max pooling processing unit 42B performs max pooling processing when necessary.

An output of the max pooling processing unit 42B is input to the multi-abstraction level analysis processing unit 41C.

In addition, control data is input to the multi-abstraction level analysis processing unit 41C from a control line input unit 43C.

Training data selected by the switch 44 based on the control data is input to the multi-abstraction level analysis processing unit 41C.

An example regarding whether or not max pooling processing is to be performed in each of the max pooling processing units 42A and 42B will be described. For example, when output from the first layer suffices as DNN feature amount compressed data ("compressed data" in diagram) and the multi-abstraction level analysis processing unit 41B in the second layer and the multi-abstraction level analysis processing unit 41C in the third layer are to be used in order to improve classifier performance, executing max pooling processing in the max pooling processing unit 42A enables recognition performance to be improved due to appropriate dimensionality reduction.

Compressed data output from each of the multi-abstraction level analysis processing units 41A, 41B, and 41C is input to the multi-abstraction level dimensional expander 24 and the residual error analyzer 26.

The multi-abstraction level dimensional expander 24 decodes compressed data output from the multi-abstraction level analysis processing units 41A, 41B, and 41C and outputs a decoded image. In other words, the multi-abstraction level dimensional expander 24 attempts to restore an original image from compressed data.

The restored image (decoded image) is input to the expectation feedback calculator 25.

A decoded image and an original image are input to the expectation feedback calculator 25. The expectation feedback calculator 25 calculates a difference between an expectation (an expected image) and the decoded image as an expectation difference amount and the expectation difference amount is input to the residual error analyzer 26 as training data.

Based on input compressed data being a DNN feature amount and the expectation difference amount as training data, the residual error analyzer 26 performs machine learning for estimating an expectation difference. Even if the estimated expectation difference is added as-is to the decoded image, an image close to the original image cannot be generated. Therefore, the estimated expectation difference is input to the Bayesian estimator 27 in order to determine a blend ratio.

The Bayesian estimator 27 determines, based on the estimated expectation difference amount input from the residual error analyzer 26, the decoded image input from the multi-abstraction level dimensional expander 24, and the expectation difference amount input from the expectation feedback calculator 25, a blend ratio of the estimated expectation difference amount and the decoded image.

<2-2. System Configuration after Machine Learning>

Figure 8:
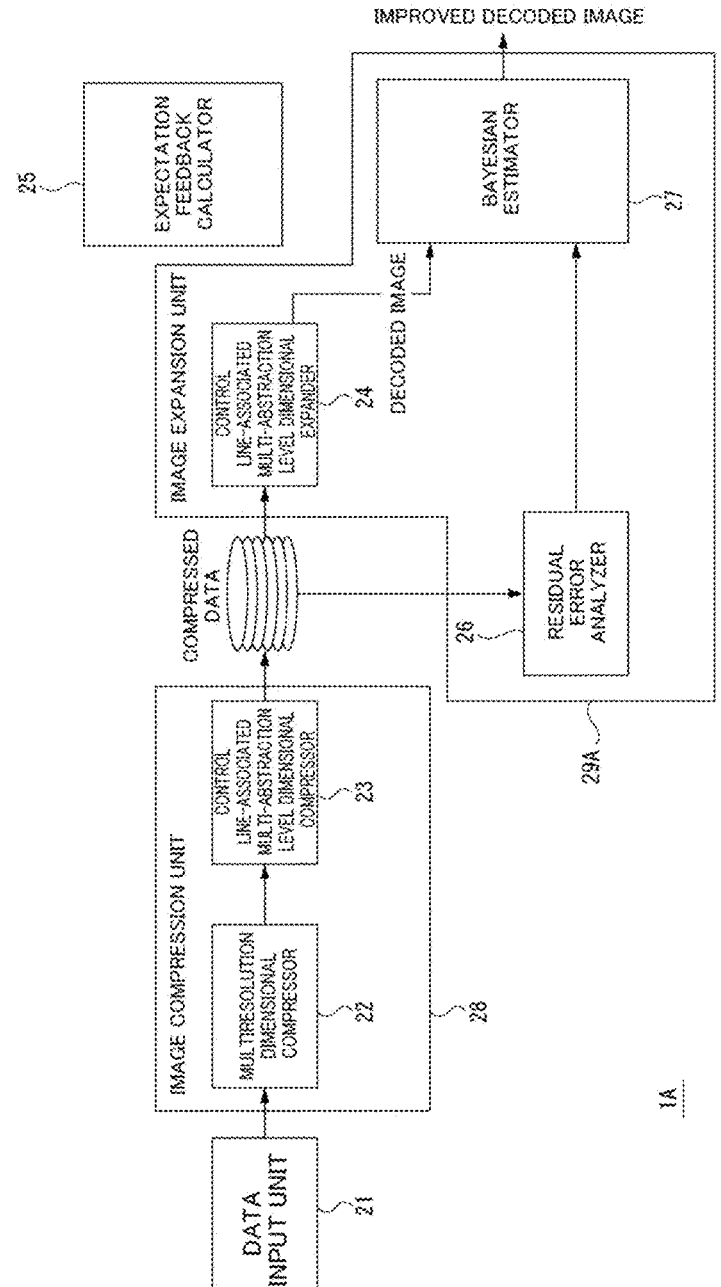
FIG. 8 is a block diagram illustrating a configuration example of the signal processing apparatus during operation according to the second embodiment.

FIG. 8 illustrates a configuration of the signal processing apparatus 1A after machine learning is completed in each unit. As illustrated, a configuration of an image expansion unit differs from that during machine learning (refer to FIG. 5). The multiresolution dimensional compressor 22 and the multi-abstraction level dimensional compressor 23 constitute the image compression unit 28 in a similar manner to during machine learning.

An image expansion unit 29A includes the residual error analyzer 26 and the Bayesian estimator 27 in addition to the multi-abstraction level dimensional expander 24.

In the image expansion unit 29A, the residual error analyzer 26 acts as a correction term for obtaining a super-resolution image and the Bayesian estimator 27 is responsible for processing to determine the blend ratio of the estimated expectation difference amount and the decoded image.

In other words, the residual error analyzer 26 and the Bayesian estimator 27 each function as a calculator in image expansion processing for outputting a super-resolution decoded image to which a pattern estimated by an AI is to be added.

After machine learning in each unit included in the signal processing apparatus 1A is completed, a feature amount with a higher abstraction level than frequency-resolved data can be extracted in a compression process of an image and a decode function having super-resolution performance with a capability such as contour formation can be acquired in an expansion process of the image.

When restoring (expanding) an image using compressed data due to conventional frequency analysis, there is a possibility that contour information lost due to image compression cannot be restored. According to the present configuration, during a process of restoring an image using DNN feature amount compressed data, since a contour restoration capability is exhibited albeit within a range of a database accumulated in neurons during the process of machine learning, an improvement in super-resolution performance can be anticipated.

<2-3. Processing Example>

An example of each processing step executed by the signal processing apparatus 1A will be described with reference to FIGS. 9 and 10.

Figure 9:
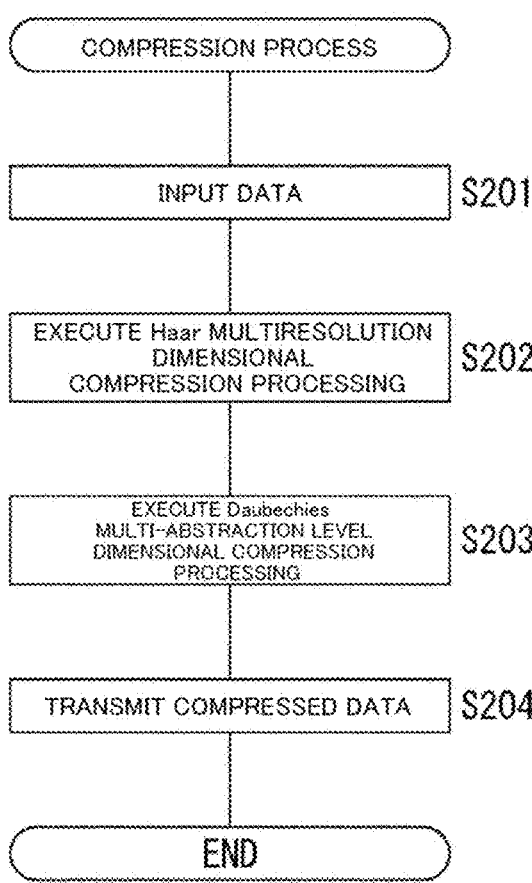
FIG. 9 is an example of a flow chart with respect to a compression process of image data according to the second embodiment.

Note that FIG. 9 is a flow chart during a compression process of image data. In addition, FIG. 10 is a flow chart during an expansion process of image data.

First, a flow of the compression process will be described with reference to FIG. 9. In step S201, the signal processing apparatus 1A accepts input of image data. Next, in step S202, the signal processing apparatus 1A executes Haar multiresolution dimensional compression processing. Since this processing has already been described with reference to FIG. 6, details will be omitted.

In step S203, the signal processing apparatus 1A executes Daubechies multi-abstraction level dimensional compression processing. Since this processing has already been described with reference to FIG. 7, details will be omitted.

In step S204, the signal processing apparatus 1A performs transmission of compressed data. Due to the processing, compressed data with respect to input image data is transmitted.

Next, a flow of the expansion process will be described with reference to FIG. 10. In step S211, the signal processing apparatus 1A accepts input of compressed data. The compressed data is the compressed data transmitted in step S204 in FIG. 9.

In step S212, the signal processing apparatus 1A performs Daubechies multi-abstraction level dimensional expansion processing. Due to the processing, a decoded image that is compressed data having been decoded is obtained.

In step S213, the signal processing apparatus 1A executes residual error analysis processing. In the processing, machine learning for estimating an expectation difference is performed based on compressed data and an expectation difference amount as training data.

In step S214, the signal processing apparatus 1A calculates a blend ratio. As described earlier, the blend ratio refers to a blend ratio between an estimated expectation difference amount and a decoded image.

Accordingly, for example, an improved decoded image having been subjected to decode processing and having super-resolution performance is obtained.

3. Summary

As described in the first embodiment and the second embodiment presented above, the signal processing apparatuses 1 and 1A include a data input unit (the image input unit 3 and the data input unit 21) to which image data is input. In addition, the signal processing apparatuses 1 and 1A include an output unit (the sensor fusion unit 6 and the multi-abstraction level dimensional expander 24) which output an output value based on data input to the data input unit. Furthermore, the signal processing apparatuses 1 and 1A include the expectation feedback calculator 5 (the expectation feedback calculator 25) which calculates a difference between an expectation based on input data (an expectation input from the expectation input unit 2 and an original image input from the data input unit 21) and an output value.

Moreover, the signal processing apparatuses 1 and 1A include the Bayesian estimator 10 (the Bayesian estimator 27) to which information on a difference and information based on image data are input, which performs machine learning for approximating an output value to an expectation based on the input pieces of information, and which performs a search for an optimum configuration. Performing machine learning with the Bayesian estimator 10 (the Bayesian estimator 27) enables a configuration for approximating an output value to an expectation to be searched.

As described in the first embodiment, an expectation in the signal processing apparatus 1 may be configured to change depending on performance of a stabilization function to be applied to image data. In other words, the Bayesian estimator 10 performs machine learning for improving a stabilization function.

As described in the first embodiment, in the signal processing apparatus 1, output data from an inertial measurement unit (IMU) may be input together with the image data to the data input unit. In other words, the signal processing apparatus 1 may include the image input unit 3 to which image data is input and the IMU data input unit 4 to which IMU data is input.

Furthermore, the signal processing apparatus 1 may include the sensor fusion unit 6 which performs sensor fusion processing for obtaining geometric and physical (for example, mechanical or optical) consistencies between input data from the inertial measurement unit and the image data.

Accordingly, consistencies between pieces of input data of different domains such as image data and IMU data can be obtained and a difference between an expectation and a present output value can be appropriately calculated by the expectation feedback calculator 5.

As described in the first embodiment, the Bayesian estimator 10 may search for an additional physical sensor for improving a stabilization function in an optimum configuration search. Alternatively, the Bayesian estimator 10 may function as a searcher for searching expectation characteristics of an additional physical sensor.

Accordingly, for example, a solution regarding what kind of sensor can be added to an imaging apparatus in order to improve a stabilization function can be obtained.

As described in the first embodiment, the Bayesian estimator 10 may search for an algorithm for performing image recognition processing (or an algorithm for performing image structure analysis processing) for improving a stabilization function in an optimum configuration search. In other words, the Bayesian estimator 10 may function as an algorithm searcher to perform image recognition or image structure analysis processing in order to improve a stabilization function in an optimum configuration search.

Accordingly, for example, a solution regarding what kind of image recognition processing can be applied to image data obtained by the imaging apparatus in order to obtain image data (for example, moving image data) with an improved stabilization function can be obtained.

There are often cases where an expected physical sensor device cannot be readily obtained. However, there are use cases where an analysis can be performed on a time-sequential change in input data such as a case where a flow of input data must be analyzed along a time series as in speech recognition, and in such cases, since it is difficult to create a sensor device for directly obtaining an analysis result, an approach of searching for a sensing algorithm as a program is to be adopted.

Therefore, with the Bayesian estimator 10 according to the present technique, there may be cases where a physical "sensor device" is to be searched as well as cases where a program-like "sensing algorithm" is to be searched.

As described in the first embodiment, the Bayesian estimator 10 may function as a calculator that shares responsibility of a stabilization function after machine learning.

Accordingly, high stabilization performance can be exhibited using a Bayesian estimation algorithm obtained by the Bayesian estimator 10 as a result of machine learning of an expectation search, image recognition, and image analysis.

As described in the second embodiment, an expectation in the signal processing apparatus 1A may change depending on performances of image compression and image restoration with respect to image data. In other words, an expectation is not limited to applications of motion analysis of image data. An apparatus including the Bayesian estimator 10 according to the present technique which searches for an input condition for improving motion analysis (the signal processing apparatus 1 according to the first embodiment) and an apparatus including the Bayesian estimator 27 which searches for efficient compression/expansion conditions of an image (the signal processing apparatus 1A according to the second embodiment) are substantially equivalent as constituent elements to the configuration described in the claims. The Bayesian estimator 27 described in the second embodiment performs machine learning for constructing an encoder and a decoder which exhibit high compression and restoration performances.

As described in the second embodiment, the signal processing apparatus 1A as an image compression processing apparatus may include the image compression unit 28 that performs image compression and the image expansion unit 29 (the image expansion unit 29A) that performs image restoration. In other words, the signal processing apparatus 1A includes a configuration for performing compression processing and expansion processing with respect to image data. According to such a configuration, machine learning for improving compression performance and restoration performance can be performed.

As described in the second embodiment, in order to improve image restoration performance in an optimum configuration search, the Bayesian estimator 27 may search for a blend ratio between a decoded image obtained by the image expansion unit 29 during machine learning and information based on a difference.

Accordingly, in order to improve image restoration performance, for example, a blend ratio of high-frequency information for obtaining a super-resolution effect is calculated.

As described in the second embodiment, the Bayesian estimator 27 functions as a calculator that shares responsibility of the function of the image expansion unit 29A after machine learning.

Accordingly, a decoded image having been improved based on the blend ratio obtained by the Bayesian estimator 27 as a result of machine learning is output from the Bayesian estimator 27.

In addition, the residual error analyzer 26 may also share responsibility of the function of the image expansion unit 29A. For example, the residual error analyzer 26 may function as a correction term for obtaining a super-resolution image.

As described in the second embodiment, a control line for changing a degree of deterioration may be input to the image compression unit 28. For example, the degree of deterioration is arbitrarily controlled via a control line.

Accordingly, a fixed length coding compression algorithm obtained by the image compression unit 28 becomes an algorithm that enables resolution to be finely adjusted based on control data input to a control line.

A signal processing method according to an embodiment is a signal processing method in which a signal processing apparatus executes processing of accepting input of image data; outputting an output value based on the input image data; calculating a difference between an expectation based on the input image data and the output value; and performing machine learning in order to approximate the output value to the expectation based on information on the difference and information based on the image data and searching for an optimum configuration.

Figure 10:
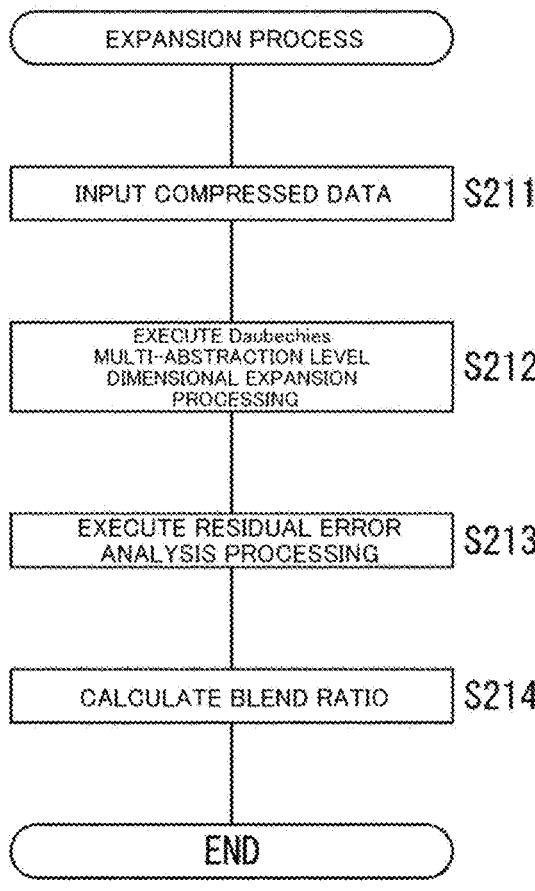
FIG. 10 is an example of a flow chart with respect to an expansion process of compressed image data according to the second embodiment.

A program according to an embodiment is a program causing, for example, a CPU, a DSP, or the like or a device including these elements to perform the processing steps illustrated in each of FIGS. 4, 9, and 10.

In other words, the program according to the embodiment causes a control unit of the signal processing apparatus 1 to execute processing of accepting an input of image data.

In addition, the program causes the control unit of the signal processing apparatus 1 to execute processing of outputting an output value based on the input image data.

Furthermore, the program causes the control unit of the signal processing apparatus 1 to execute processing of calculating a difference between an expectation based on the input image data and an output value.

Moreover, the program causes the control unit of the signal processing apparatus 1 to execute processing of performing machine learning in order to approximate an output value to an expectation based on information on the difference and information based on the image data and performing a search for an optimum configuration. According to the program, the signal processing apparatuses 1 and 1A described above can be realized.

The program that realizes the signal processing apparatuses 1 and 1A can be recorded in advance in an HDD serving as a recording medium built into a device such as a computer device or a ROM or the like in a microcomputer that includes a CPU.

Alternatively, the program can be stored (recorded) temporarily or perpetually on a removable recording medium such as a flexible disc, a compact disc read-only memory (CD-ROM), a magneto optical (MO) disc, a digital versatile disc (DVD), a Blu-ray Disc (registered trademark), a magnetic disk, a semiconductor memory, or a memory card. The removable recording medium can be provided as so-called package software.

The program can be installed from the removable recording medium to a personal computer or the like and can also be downloaded from a download site via a network such as a local area network (LAN) or the Internet.

Furthermore, such a program is suitable for a wide range of provision of the signal processing apparatuses 1 and 1A according to the embodiments. For example, by downloading the program to devices equipped with a camera function including a portable terminal apparatus such as a smartphone or a tablet, a mobile phone, a personal computer, a game device, a video device, and a personal digital assistant (PDA), it is possible to cause the smartphone or the like to function as the signal processing apparatuses 1 and 1A according to the present disclosure.

In conventional sensor development, a general so-called bottom-up method from a device to a set of products with element technology as a starting point is a flow from the development of a sensor device to the development of a set of products. However, in such a development process, there is a risk that, despite spending huge research and development expenses to develop sensors, a market scale is misjudged at the stage of a set of products and loss is suffered in terms of a research and development cost of the device.

On the other hand, the presently proposed approach is a top-down development approach from a set of products to a device which starts from a product with desired specifications and derives a sensor module or a sensing algorithm to be developed. Accordingly, a market scale of a final product can be estimated and the estimates can be efficiently fed back to be tied into investing towards sensor development. Furthermore, at the same time, the algorithm of the present system can also be acquired as an artifact of machine learning.

In particular, there has been recent progress in the miniaturization of semiconductor devices and environments are being created where MEMS (Micro Electro Mechanical Systems) devices can be manufactured with the same easiness as using a 3D printer as in the case of Minimal Fab.

By effectively utilizing such a development environment, a simulation sensor can be actually manufactured as a MEMS sensor, a MEMS sensor configuration and an accompanying algorithm can be generated at the same time, and businesses related to high-mix low-volume sensor solutions can be developed in a speedy manner.

The advantageous effects described in the present specification are merely exemplary and are not limited, and other advantageous effects may be obtained.

4. Present Technique

The present technique can also be configured as follows.

(1)

A signal processing apparatus, including:

a data input unit to which image data is input;

an output unit configured to output an output value based on the data input to the data input unit;

an expectation feedback calculator configured to calculate a difference between an expectation based on the input data and the output value; and a Bayesian estimator to which information on the difference and information based on the image data are input and which is configured to perform machine learning in order to approximate the output value to the expectation based on the input information and to search for an optimum configuration.

(2)

The signal processing apparatus according to (1), wherein the expectation varies depending on performance of a stabilization function to be applied to image data.

(3)

The signal processing apparatus according to (2), wherein output data from an inertial measurement unit is input together with the image data to the data input unit, and the signal processing apparatus includes a sensor fusion unit configured to perform sensor fusion processing for obtaining geometric and physical consistencies between input data from the inertial measurement unit and the image data.

(4)

The signal processing apparatus according to (3), wherein the Bayesian estimator is configured to search for an additional physical sensor for improving the stabilization function in the search for an optimum configuration.

(5)

The signal processing apparatus according to (3), wherein the Bayesian estimator is configured to search for an AI block to perform image recognition processing for improving the stabilization function in the search for an optimum configuration.

(6)

The signal processing apparatus according to any one of (2) to (5), wherein the Bayesian estimator is configured to function as a calculator that shares responsibility of the stabilization function after the machine learning.

(7)

The signal processing apparatus according to (1), wherein the expectation varies depending on performance of image compression and image restoration with respect to image data.

(8)

The signal processing apparatus according to (7), including:

an image compression unit configured to perform the image compression; and an image expansion unit configured to perform the image restoration.

(9)

The signal processing apparatus according to (8), wherein the Bayesian estimator is configured to search for a blend ratio of a decoded image obtained by the image expansion unit during the machine learning and information based on the difference in order to improve performance of the image restoration when searching for the optimum configuration.

(10)

The signal processing apparatus according to (8), wherein the Bayesian estimator is configured to function as a calculator that shares responsibility of the function of the image expansion unit after the machine learning.

(11)

The signal processing apparatus according to any one of (8) to (10), wherein a control line for changing a degree of deterioration is input to the image compression unit.

(12)

A signal processing method in which a signal processing apparatus executes processing of accepting input of image data;

outputting an output value based on the input image data;

calculating a difference between an expectation based on the input image data and the output value; and performing machine learning in order to approximate the output value to the expectation based on information on the difference and information based on the image data and searching for an optimum configuration.

(13)

A program causing a signal processing apparatus to execute processing of:

accepting input of image data;

outputting an output value based on the input image data;

calculating a difference between an expectation based on the input image data and the output value; and performing machine learning in order to approximate the output value to the expectation based on information on the difference and information based on the image data and searching for an optimum configuration.

REFERENCE SIGNS LIST 1, 1A Signal processing apparatus
3 Image input unit (data input unit)
4 IMU data input unit (data input unit)
5 Expectation feedback calculator
6 Sensor fusion unit (output unit)
10 Bayesian estimator
21 Data input unit
24 Multi-abstraction level dimensional expander (output unit)
25 Expectation feedback calculator
27 Bayesian estimator
28 Image compression unit
29, 29A Image expansion unit
43, 43A, 43B, 43C Control line input unit

The invention claimed is:

1. A signal processing apparatus, comprising:

circuitry configured to:

receive image data and data from an inertial measurement unit (IMU);

perform sensor fusion processing for obtaining consistencies between the image data and the data from the IMU;

output an output value based on the image data;

calculate a difference between an expectation based on a desired performance of a stabilization function to be applied to the image data and the output value;

search for an optimum configuration by identifying at least one of a physical sensor or an image recognition algorithm, by using a Bayesian estimator to which information on the difference and information based on the image data are input to perform machine learning that approximates the output value to the expectation; and subsequently reconfigure a signal processing algorithm of the signal processing apparatus based on the identified optimum configuration and process subsequent image data using the reconfigured signal processing algorithm to generate an output image that approximates the expectation.

2. The signal processing apparatus according to claim 1, wherein the Bayesian estimator is configured to search for a physical sensor for improving the stabilization function in the search for an optimum configuration.

3. The signal processing apparatus according to claim 1, wherein the Bayesian estimator is configured to search for an algorithm to perform image recognition processing for improving the stabilization function in the search for an optimum configuration.

4. The signal processing apparatus according to claim 1, wherein the Bayesian estimator is configured to function as a calculator that shares responsibility of the stabilization function after the machine learning.

5. The signal processing apparatus according to claim 1, wherein the expectation varies depending on performance of image compression and image restoration with respect to image data.

6. The signal processing apparatus according to claim 5, wherein the circuitry is further configured to:

perform the image compression; and perform the image restoration.

7. The signal processing apparatus according to claim 6, wherein the Bayesian estimator is configured to search for a blend ratio of a decoded image obtained during the machine learning and information based on the difference in order to improve performance of the image restoration when searching for the optimum configuration.

8. The signal processing apparatus according to claim 6, wherein the Bayesian estimator is configured to function as a calculator that shares responsibility of performing the image restoration after the machine learning.

9. The signal processing apparatus according to claim 6, wherein the circuitry is configured to change a degree of deterioration used for the image compression.

10. A signal processing method in which a signal processing apparatus executes processing of:

accepting input of image data and data from an inertial measurement unit (IMU);

performing sensor fusion processing for obtaining consistencies between the image data and the data from the IMU;

outputting an output value based on the input image data;

calculating a difference between an expectation based on a desired performance of a stabilization function to be applied to the input image data and the output value;

searching for an optimum configuration by identifying, at least one of a physical sensor or an image recognition algorithm, by performing machine learning using information on the difference and information based on the image data to approximate the output value to the expectation; and subsequently reconfiguring a signal processing algorithm of the signal processing apparatus based on the identified optimum configuration and processing subsequent image data using the reconfigured signal processing algorithm to generate an output image that approximates the expectation.

11. A non-transitory computer readable storage device storing a program causing a signal processing apparatus to execute processing of:

accepting input of image data and data from an inertial measurement unit (IMU);

performing sensor fusion processing for obtaining consistencies between the image data and the data from the IMU;

outputting an output value based on the input image data;

calculating a difference between an expectation based on a desired performance of a stabilization function to be applied to the input image data and the output value;

searching for an optimum configuration by identifying, at least one of a physical sensor or an image recognition algorithm, by performing machine learning using information on the difference and information based on the image data to approximate the output value to the expectation; and subsequently reconfiguring a signal processing algorithm of the signal processing apparatus based on the identified optimum configuration and processing subsequent image data using the reconfigured signal processing algorithm to generate an output image that approximates the expectation.

12. The signal processing method according to claim 10, further comprising searching for a physical sensor for improving the stabilization function in the search for the optimum configuration.

13. The signal processing method according to claim 10, further comprising searching for an algorithm to perform image recognition processing for improving the stabilization function in the search for the optimum configuration.

14. The signal processing method according to claim 10, wherein the expectation varies depending on performance of image compression and image restoration with respect to image data.

15. The signal processing method according to claim 14, further comprising:

performing the image compression; and performing the image restoration.

16. The signal processing method according to claim 15, further comprising searching for a blend ratio of a decoded image obtained during the machine learning and information based on the difference in order to improve performance of the image restoration when searching for the optimum configuration.

17. The signal processing apparatus according to claim 1, wherein the sensor fusion processing combines the image data and the data from the IMU to generate a unified motion vector representing a movement of the signal processing apparatus.

18. The signal processing apparatus according to claim 1, wherein the Bayesian estimator refines the search for the optimum configuration based on prior information relating to performance characteristics of different sensor types or different image recognition algorithm.

19. The signal processing method according to claim 10, wherein the image recognition algorithm is configured to separate global motion of a camera from local motion of a subject to calculate the difference between the expectation and the output value.

20. The signal processing method according to claim 10, wherein the output image that approximates the expectation is a stabilized image corrected for rotational or translational motion of the signal processing apparatus.

* * * * *